United States Patent [19]

Ward et al.

[11] Patent Number: 5,531,422
[45] Date of Patent: Jul. 2, 1996

[54] DOUBLE LATCHING VALVE

[75] Inventors: James R. Ward, Milwaukee; Thomas J. Stobbs, Brookfield, both of Wis.

[73] Assignee: Applied Power Inc., Butler, Wis.

[21] Appl. No.: 226,743

[22] Filed: Apr. 12, 1994

[51] Int. Cl.⁶ .................................................. F16K 39/00
[52] U.S. Cl. ........................................ 251/282; 251/129.07
[58] Field of Search ........................ 251/129.01, 129.02, 251/117, 129.07, 30.03, 30.02, 30.1, 324, 325, 282; 137/625.33, 495

[56] References Cited

U.S. PATENT DOCUMENTS

| | | |
|---|---|---|
| 2,108,979 | 2/1938 | Wile . |
| 2,891,760 | 6/1959 | Dewar .................... 251/30.03 X |
| 2,916,252 | 12/1959 | Hobbs et al. .............. 251/129.07 |
| 3,312,445 | 4/1967 | Trombatore et al. ........ 251/30.03 |
| 3,464,668 | 9/1969 | Jacob . |
| 3,471,119 | 10/1969 | Risk . |
| 3,887,162 | 6/1975 | Antoni et al. . |
| 4,643,227 | 2/1987 | Suzuki et al. ............ 251/129.07 X |
| 4,662,600 | 5/1987 | Schwelm ................. 251/30.03 |
| 4,714,089 | 12/1987 | Ueda et al. . |
| 4,779,837 | 10/1988 | Mito et al. .............. 251/30.03 X |
| 4,848,721 | 7/1989 | Chudakov ............... 251/30.02 |
| 4,852,853 | 8/1989 | Toshio et al. ............ 251/129.07 |
| 5,069,420 | 12/1991 | Stobbs et al. ........... 251/30.02 |
| 5,163,654 | 11/1992 | Borsatti et al. .......... 251/129.07 X |

FOREIGN PATENT DOCUMENTS

91/10077  7/1991  WIPO .

*Primary Examiner*—Kevin Lee
*Attorney, Agent, or Firm*—Quarles & Brady

[57] ABSTRACT

A double latching hydraulic valve of the type that either stays open or stays closed at high pressures and only changes state (between open or closed) at low pressures has three ports, with a main valve between the first and second ports which is opened or closed by a poppet. The first port is always in communication with a pressure chamber which biases the poppet against the main valve seat, and the pressure chamber is placed in communication with the third port, which can be connected to tank pressure, only in the open position of the poppet. Thus, a high pressure is provided in the pressure chamber to keep the poppet closed at high pressures, and a low pressure is provided in the pressure chamber to keep the poppet open at high pressures, without excessive leakage through the valve when it is closed.

9 Claims, 2 Drawing Sheets

DOUBLE LATCHING VALVE

FIELD OF THE INVENTION

This relates to a hydraulic control valve, and more specifically, to such a valve which is particularly adapted for an electronically controlled suspension system of a vehicle such as an automobile.

DISCUSSION OF THE PRIOR ART

Electronically controlled suspension systems are vehicle suspension systems in which the stiffness of suspension dampers, such as hydraulic shock absorbers or struts, can be varied between soft and firm settings, either automatically or by the vehicle operator. In these systems, the vehicle operator can modify the vehicle ride mode as desired or an automatic system can be employed to sense road conditions and select the appropriate ride mode without operator intervention.

Quite often, the shocks or struts incorporated in electronically controlled suspension systems include an electronically controlled valve which operates in parallel with orifices and relief valves within the damper. Such a suspension damper is disclosed, for example, in U.S. Pat. No. 5,069,420 with particular reference to FIG. 7 of said patent. The electronically controlled parallel valve is opened or closed, in accordance with corresponding signals from the control system to vary the stiffness of the damper.

Such shocks or struts can be subjected to high pressure impulses. It has been found that if the valve changes state during a high pressure period, objectionable noises caused by the water hammer effect are likely.

One way of overcoming this is to allow the valve to change state only during periods of low pressure. Such valves are known as "double latching", since during periods of high pressure, they either stay open or stay closed.

Periods of low pressure, affording an opportunity for a valve to change state, occur frequently in a shock or strut since such periods happen every time the direction of motion of the shock or strut changes. At these times, the shock pressure goes from a positive differential pressure to a negative differential pressure, or vice versa, so a low pressure zone on both sides of zero pressure is passed through at these times, where the valve can change state without severe noises.

Such double latching valves are known, but excessively leaked when closed because of passages in the valve thought necessary to provide the double-latching function of the valve. Such leakage in the closed state of the valve is undesirable because it results in partially bypassing the internal valving of the shock or strut, when that is not intended.

SUMMARY OF THE INVENTION

The present invention is directed at providing a double latching valve, i.e. a valve which stays either open or closed at high pressure differences across its seat and only changes state (from open to closed or from closed to open) when the pressure difference across its seat is relatively low. The present invention differs from prior art valves of this type by providing such a valve which reduces leakage through the valve when the valve is closed.

The invention provides a hydraulic valve having a first port, a second port and a third port, a main valve seat between the first and second ports, a poppet moveable toward or away from the main valve seat to vary a flow area between the first and second ports, and a pressure chamber on a side of the poppet opposite from the valve seat in which a pressure in the pressure chamber urges the poppet toward the valve seat. In an open position of the poppet, communication is provided between the first port and the pressure chamber and communication is provided between the pressure chamber and the third port. In a closed position of the poppet, the communication between the pressure chamber and the third port is closed. Thereby, no leakage path is provided through the valve when the valve is closed while providing the double latching function of the valve.

Communication between the first port and the pressure chamber can conveniently be provided by a passageway in the poppet. This passageway can be maintained open in both positions by opening at the exterior surface of the poppet in a reduced diameter of the poppet which is always exposed to the first port pressures.

Communication between the pressure chamber and the third port in the open position can also conveniently be provided by a passageway through a sidewall of the poppet. In this regard, edges of this passageway at the outer perimeter of the poppet can provide a sealing overlap against walls of a bore in which the poppet slides in the closed position of the poppet. When the poppet shifts to the open position, this passageway can be moved into communication with openings in the wall of the bore in which the poppet slides which are in communication with the third port.

Other features and advantages of the invention will be apparent from the following detailed description and from the drawings.

DETAILED DESCRIPTION OF THE PREFERRED EMBODIMENTS

Figure 1:
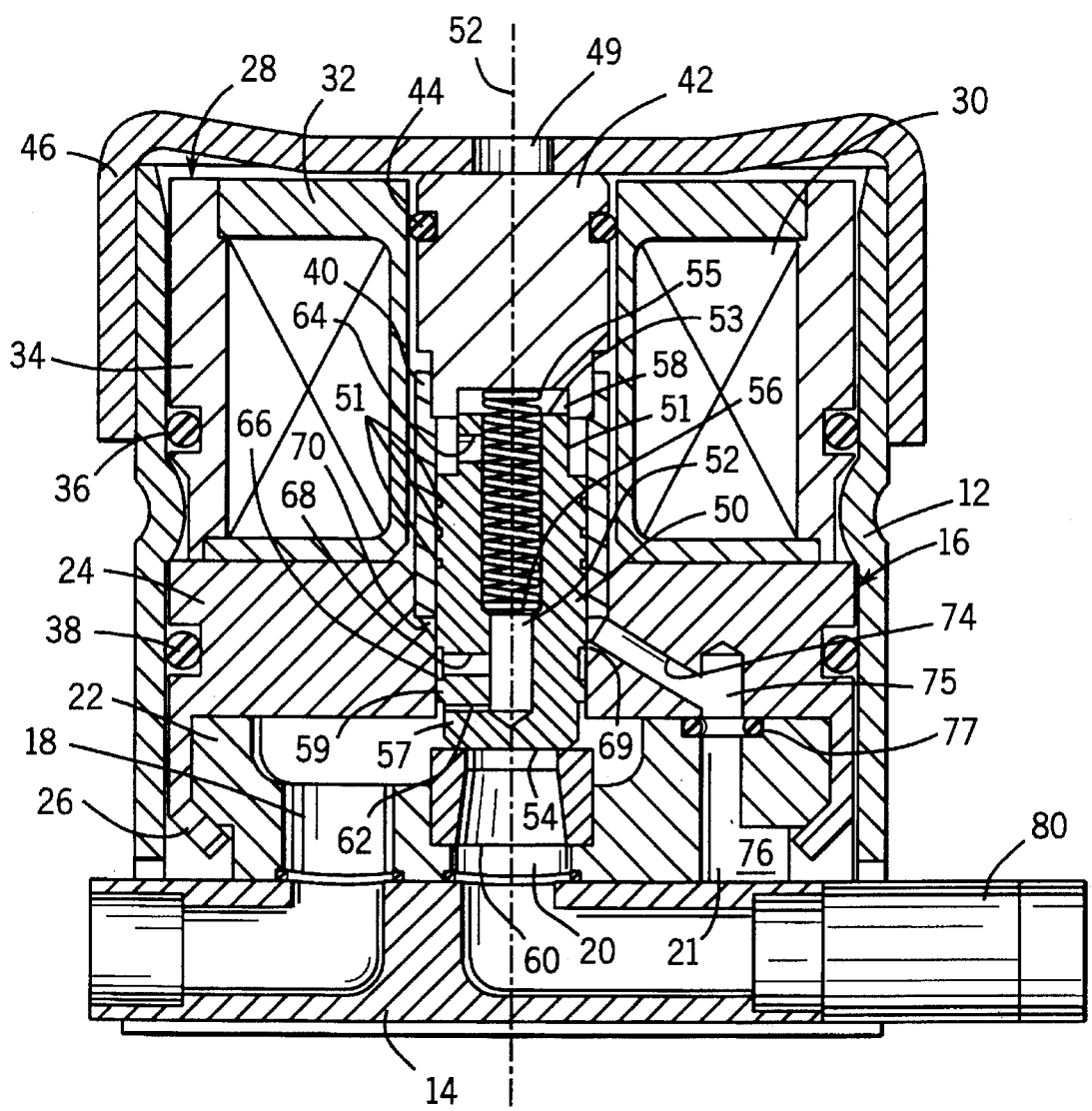
FIG. 1 is a cross-sectional view of a valve of the invention.

Referring to FIG. 1, a valve 10 of the invention may be provided in a housing 12. Housing 12 may be part of a vibration damper in an electronically controlled suspension control system into which a valve 10 of the invention is inserted. Manifold 14 may be provided as part of the valve 10 or may be a portion of the vibration damper which interfaces with the valve 10. In any event, valve 10 has a valve casing 16 in which three ports, 18, 20 and 21 are defined.

Ports 18 and 20 are connected in the line of the flow to be controlled, which may, for example be a flow between the upper and lower piston chambers in a vibration damper or between one of the piston chambers in the vibration damper and a reservoir of hydraulic fluid. In the valve 10 disclosed, flow is intended to be in one direction only, from the port 18 to the port 20.

The valve casing 16 includes a manifold head 22, which is preferably made of steel, and a cup 24 which is also preferably made of a magnetic material such as steel and is crimped over at 26 so as to retain the manifold head 22. An O-ring 38 may also be provided for a fluid tight seal between the valve casing 16 and the housing 12. Above the valve casing 16, a coil assembly 28 including windings 30, bobbin 32 and encapsulation 34 resides within the housing 12 with an O-ring 36 between the encapsulation 34 and the housing 12 to help insure a fluid tight seal. Leads 31 (FIG. 2) extend outside of the encapsulation 34 for connection to an electrical control system to vary the current through windings 30 and therefore the magnetic field acting on poppet 50, so as to control the opening and closing of poppet 50, as further discussed below.

A sleeve 40, preferably made of a non-magnetic material such as stainless steel, is pressed into an enlarged bore of the cup 24 at its lower end and at its upper end a pole piece 42 preferably made of a magnetic material such as steel is pressed into the sleeve 40 and brazed thereto. The pole piece 42 is surrounded by an O-ring 44 which creates a fluid tight seal between the pole piece 42 and the bobbin 32. A cap 46 is secured over the upper end of the housing 12 by any suitable means such as by being bonded to the housing 12 or a screw could be inserted through hole 49 and threaded into the pole piece 42.

Within the bore defined by the cup 24, the sleeve 40, and the pole piece 42, a poppet 50 is slidably received to slide along axis 52. The poppet 50 is preferably made of a magnetic material such as steel and can preferably be made from cylindrical rod stock machined into the shape shown in FIGS. 1 and 2. The poppet 50 is closely received in sliding engagement in the bores formed by the cup 24 and sleeve 40 so that there is not appreciable fluid flow in the axial direction past the sliding surfaces of the poppet 50 and the bores defined by the cup 24 and sleeve 40. The poppet 50 has three annular grooves 51 which serve to circumferentially equalize the pressures acting around the periphery of the poppet 50 in well known manner.

The poppet 50 has a central blind bore 52 which opens at piston face 53 and extends toward but not all the way to sealing face 54 of the poppet 50. Spring 55 seats against shoulder 56 of bore 52 at the lower end of spring 55 and at its upper end abuts against pole piece 42. Spring 55 is a compression spring so it urges poppet 50 toward seat 60 so that sealing face 54 abuts seat 60 to seal off communication between ports 18 and 20 in the closed state of the valve.

Pressure chamber 58 is defined between pole piece 42 and poppet 50, and includes bore 52. A pressure in pressure chamber 58 acts with the spring 55 to urge poppet 50 toward seat 60. Pressure is communicated from port 18 to bore 52 through a bore 62 which extends from the external periphery of poppet 50 through the wall of poppet 50 to bore 52. Bore 62 is small in diameter so as to limit the flow from port 18 to bore 52. For example, the diameter of bore 62 may typically be 0.020 inches. Thus, bore 62 admits pressure fluid to the pressure chamber 58, which acts to urge poppet 50 toward the seat to the closed position shown in FIG. 1.

In this regard, bore 52 admits pressure fluid from the lower end of bore 52 to the upper end of poppet 50 (referred to above as the piston face 53) and also a cross bore 64 formed in the wall of the poppet 50 at its upper end admits pressure fluid from bore 52 to a reduced diameter external cylindrical surface 51 of poppet 50 at the upper end of poppet 50. Therefore, pressure fluid in the pressure chamber 58 (which also includes the chamber defined between surface 51 and sleeve 40 in the preferred embodiment) acts against an area of poppet 50 equal to the area of the bore through sleeve 40 in which poppet 50 slides.

Poppet 50 also has a reduced external diameter 57 at its lower end into which bore 62 opens. Above bore 62 and at a larger diameter periphery 59 of poppet 50, an annular groove 66 is formed in the poppet 50. Cross-bore 68 communicates annular groove 66 with bore 52. At the upper side of channel 66, a sealing land 69 is formed which closely confronts a shoulder formed by recess 70 of the bore in cup 24 in which poppet 50 slides when the poppet 50 is in the closed position shown in FIG. 1.

Figure 2:
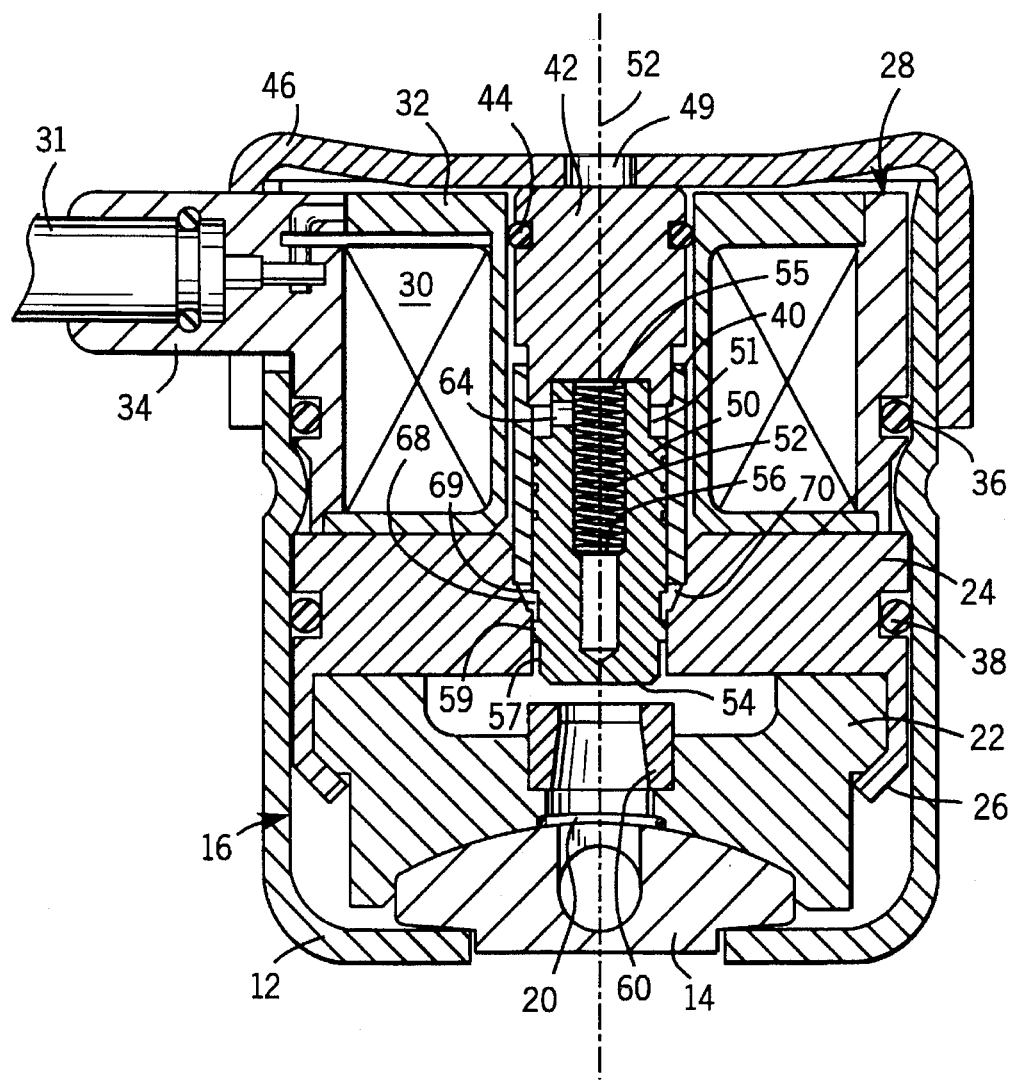
FIG. 2 is a cross-sectional view similar to FIG. 1 but taken in a plane 90° to the plane of FIG. 1.

When poppet 50 is moved to the open position shown in FIG. 2, land 69 is moved away from the sealed position shown in FIG. 1 so that annular recess 70 formed in cup 24 is placed in communication with groove 66. Annular recess 70 communicates with the third port 21 via passageways 74, 75 and 76. O-ring 77 provides a seal between the body 22 and cup 24 so as to prevent fluid from leaking out of the passageways 75 and 76 where they interface. Thus, in an open position of the valve, such as shown in FIG. 2, pressure chamber 58 is placed in communication with the third port 21 via passageways 52 (and 64), 68, 66, 70, 74, 75 and 76.

This configuration is useful in an external hydraulic valve for an automotive suspension shock or strut in which the third port 21 is connected to tank or reservoir pressure. The second port 20 is also typically connected to tank or reservoir pressure, but through a check valve 80, as is well known in the art, which provides a certain minimum pressure difference, for example 20 psi, at the port 20 relative to port 21. In the closed position as shown in FIG. 1, the pressure at port 18 is admitted to the pressure chamber 58 via bore 62 and no appreciable leakage from the pressure chamber 58 is provided to port 21 since land 69 confronting the bore in cup 24 cuts off communication between the recess 70 and the groove 66. If there is a high pressure in port 18, for example greater than 50 psi, even if coil 28 is energized, the magnetic force produced on the poppet 50 will not be able to overcome the combined forces of the pressure acting in pressure chamber 58 and spring 55, which together hold the poppet 50 against seat 60. Only when the pressure in port 18 subsides to a relatively low level, i.e. less than 50 psi, can the force produced by the coil assembly 28 on the poppet 50 overcome the combined spring and hydraulic forces holding the poppet 50 closed, which then opens the poppet 50, moving it away from the seat 60.

In the open position shown in FIG. 2, full pressure from port 18 acts on the sealing face 54 and the areas of poppet 50 surrounding the sealing face 54 which holds the poppet 50 open. In the open position, a small amount of hydraulic fluid can leak through bore 62 into the bore 52, but pressure does not build up in pressure chamber 58 because the fluid pressure in bore 52 is relieved through passageways 68, 66 and 70 to the third port 21. Thus, only when the pressure acting on the lower surfaces of poppet 50 reaches a low enough level so that spring 55 and any residual force due to any tank pressure acting in the pressure chamber 58 can overcome it, will the poppet 50 close to the position shown in FIG. 1.

Thus, the poppet 50 can only change state at low pressure differentials and is "latched" in either the open position or the closed position at high pressure differentials.

Figure 3:
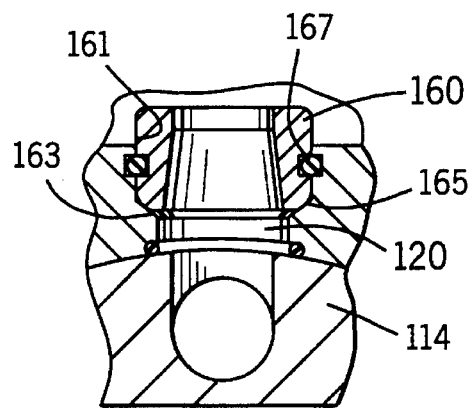
FIG. 3 is a detail view illustrating an alternate embodiment of the invention.

Persons skilled in the art may make many modifications and variations of the preferred embodiment which will still incorporate the invention. For example, FIGS. 1 and 2 show one configuration of the seat 60 and FIG. 3 illustrates an alternate configuration. In FIG. 3, corresponding parts are identified with the same reference numbers as in FIGS. 1 and 2, plus 100. Both embodiments incorporate the invention, the only difference between the two embodiments being that in FIGS. 1 and 2, the seat 60 is pressed into, molded into or otherwise firmly affixed in the head 22, so as to create a fluid-tight seal between the seat 60 and the head 22, and in the embodiment of FIG. 3, a loose connection exists between the seat 160 and the head 122. The bore 161 in the head 122 which receives the seat 160 has a frusto-conical section 163 on which radiused edge 165 of seat 160 can "knuckle" slightly so as to seat in face-to-face contact against face 54. The seat 160 is retained in the bore 161 by a snap ring 167, which fits loosely in an annular space formed by grooves in the seat 160 and bore 161. The connection between the seat 60 or 160 and the head 122 forms no part of the present invention, and any suitable connection between the seat and head could be used, or the seat could even be formed integrally with the head.

Therefore, the invention should not be limited to the embodiment described, but should be defined by the claims which follow.

We claim:

1. In a hydraulic valve having a first port, a second port and a third port, a main valve seat between said first and second ports, a poppet moveable toward or away from said main valve seat to vary a flow area between said first and second ports, and a pressure chamber on a side of said poppet opposite from said valve seat in which a pressure in said pressure chamber urges said poppet toward said valve seat, the improvement wherein:

in an open position of said poppet communication is provided between said first port and said pressure chamber and communication is provided between said pressure chamber and said third port;

in a closed position of said poppet said communication between said pressure chamber and said third port is closed;

said communication between said pressure chamber and said third port in said open position is provided at least in part by a passageway through a sidewall of said poppet; and wherein an outer end of said passageway seats against a bore in which said poppet slides in said closed position of said poppet.

2. In a hydraulic valve having a first port, a second port and a third port, a main valve seat between said first and second ports, a poppet moveable toward or away from said main valve seat to vary a flow area between said first and second ports, and a pressure chamber on a side of said poppet opposite from said valve seat in which a pressure in said pressure chamber urges said poppet toward said valve seat, the improvement wherein:

in an open position of said poppet communication is provided between said first port and said pressure chamber and communication is provided between said pressure chamber and said third port;

in a closed position of said poppet said communication between said pressure chamber and said third port is closed;

said communication between said pressure chamber and said third port in said open position is provided at least in part by a passageway through a sidewall of said poppet; and wherein in said open position said passageway communicates with an opening in a bore in which said poppet slides and said opening is in communication with said third port.

3. The improvement of claim 2, wherein said opening in said bore is defined by an annular groove in said bore.

4. In a hydraulic valve having a first port, a second port and a third port, a main valve seat between said first and second ports, a poppet moveable toward or away from said main valve seat to vary a flow area between said first and second ports, and a pressure chamber on a side of said poppet opposite from said valve seat in which a pressure in said pressure chamber urges said poppet toward said valve seat, the improvement wherein:

in an open position of said poppet communication is provided between said first port and said pressure chamber and communication is provided between said pressure chamber and said third port;

in a closed position of said poppet said communication between said pressure chamber and said third port is closed; and wherein said communication between said pressure chamber and said third port in said open position is provided in part by openings in a sidewall of said poppet which communicate with said third port in said open position but are shifted out of communication with said third port in said closed position, said openings in said closed position confronting a wall of a bore in which said poppet slides.

5. In a hydraulic valve having a first port, a second port and a third port, a main valve seat between said first and second ports, a poppet slidable axially in a bore toward or away from said main valve seat to vary a flow area between said first and second ports, and a pressure chamber on a side of said poppet axially opposite from said main valve seat in which a pressure in said pressure chamber urges said poppet toward said valve seat, the improvement wherein:

a first passageway in said poppet provides communication between said first port and said pressure chamber in both said open position and said closed position of said poppet; and a second passageway in said poppet provides communication between said pressure chamber and said third port in said open position of said poppet but not in said closed position of said poppet.

6. The improvement of claim 5, wherein said first passageway includes a radial bore through a sidewall of said poppet, said bore opening to a reduced diameter exterior surface of said poppet.

7. The improvement of claim 5, wherein said second passageway includes a passageway through a sidewall of said poppet, said passageway opening to an exterior surface of said poppet which is in sliding contact with said bore in which said poppet slides.

8. The improvement of claim 7, wherein said second passageway includes a circumferential groove around said exterior surface of said poppet.

9. The improvement of claim 8, wherein a sealing land is defined at a radially exterior shoulder of said groove which is distal from said main valve seat, said shoulder closing off communication between said groove and said third port in said closed position of said poppet and establishing communication between said groove and said third port in said open position of said poppet.

* * * * *